United States Patent [19]

Pankoke

[11] Patent Number: 4,537,408

[45] Date of Patent: Aug. 27, 1985

[54] DEVICE FOR APPLYING SURFACE PRESSURE TO ADVANCING WORKPIECES

[75] Inventor: Werner Pankoke, Bielefeld, Fed. Rep. of Germany

[73] Assignee: Firma Theodor Hymmen KG., Bielefeld, Fed. Rep. of Germany

[21] Appl. No.: 598,948

[22] Filed: Apr. 11, 1984

[30] Foreign Application Priority Data

Apr. 13, 1983 [DE] Fed. Rep. of Germany ....... 3313406

[51] Int. Cl.³ ............ F16J 15/46

[52] U.S. Cl. ............ 277/34

[58] Field of Search ............ 277/34, 34.3, 34.6

[56] References Cited

U.S. PATENT DOCUMENTS 3,985,365 10/1976 Catanzaro ............ 277/34

4,268,331 5/1981 Stevens ............ 277/34.3

4,345,735 8/1982 Regan ............ 277/34.3

*Primary Examiner*—Robert I. Smith

*Attorney, Agent, or Firm*—Sprung Horn Kramer & Woods

[57] ABSTRACT

In a device for applying surface pressure to advancing workpieces like sheets of wood-based material and similar products with at least one revolving compression belt that a pressure plate acts on the inside of, several pressure chambers are distributed along the belt. Each chamber is constituted out of a holder that has a sealing strip. The holder and sealing strip are secured in such a way that they can be adjusted in a groove in the pressure plate by means of lateral guides constituted out of screws, adapters, or similar structures that are secured in such a way that they can be adjusted to the holder in the plane of the belt in such a way that deleterious horizontal displacement forces exerted by the belt on the sealing strip can be diverted into the pressure plate.

10 Claims, 9 Drawing Figures

DEVICE FOR APPLYING SURFACE PRESSURE TO ADVANCING WORKPIECES

BACKGROUND OF THE INVENTION

The present invention relates to a device for applying surface pressure to advancing workpieces like sheets of wood-based material and similar products in which at least one revolving compression belt can be pressed against the workpiece by a pressure medium hose that can be introduced into a pressure chamber, which is adjacent to the belt and sealed off with a sealing strip, whereby the sealing strip is introduced by a holder in a groove in a pressure plate and the compression belt is positioned in such a way as to slide along the sealing strip.

Whereas the pressure medium, compressed air for example, in one device of this type advances the holder and sealing strip perpendicular to the surface of the compression belt, the compressed air in the pressure chamber generates as it acts on the lateral surface of the sealing strip a force that parallels the surface of the compression belt. Since this force is expressed at the holder in the form of a moment that causes the holder to tilt inside the groove, the compressed air can no longer displace the holder in relation to the pressure plate. The sealing strip can accordingly no longer follow the deviations of the compression belt out of its plane that occur during pressing, resulting in narrow gaps between the compression belt and the sealing strip through which compressed air can escape out of the pressure chamber.

SUMMARY OF THE INVENTION

The object of the present invention is to maintain and advance the holder that slides in the groove without tilting, to secure the holder against falling, or being forced, out of the pressure plate, and to ensure perfect sealing between the pressure plate and the holder.

This object is attained in accordance with the invention by at least one lateral groove, notch or similar structure positioned in the holder transversely to its length and to the surface of the continuous compression belt, with the projecting end of a longitudinally displaceable screw inserted in the pressure plate, of a guide pin, or of an adaptor bordering in the groove, notch, or similar structure.

The linearly adjacent ends of the screw or pin in the groove or the adaptors lying adjacent in a plane in the notch or similar structure transmit horizontal translational forces that have a detrimental effect on the seal to the pressure plate. Friction on the lateral surfaces of the holder in the groove are kept small, in addition to which these surfaces can be lubricated and can even be polished to decrease friction even more. This further improves sealing off of the lateral surfaces of the holder with respect to the walls of the groove in the pressure plate and to the pressure space accommodated therein.

The readjustability of the screws or similar structures makes it possible to adjust the sealing adaption seat between the holder and the walls of the groove inside the pressure plate such that the pressure medium (inside the pressure plate) that elastically forces the holder and the sealing strip against the compression belt does not have access to the outer air.

When a pressure-medium hose is positioned upstream in the groove parallel to the holder in accordance with another embodiment of the invention, the pressure medium can not only force the holder and sealing strip elastically against the sealing strip through the hose but also function as a coolant for the holder and the seal.

In a preferred embodiment, the groove can be demarcated at its ends or the notch at one end by a curve.

In another preferred embodiment, the screws, the pin, or the similar structure can have an open lubricator bore that ends in front of the lateral surface of the holder. Moreover, the groove can be a bore relief. Alternatively, the groove or notch can be open toward the compression belt.

In a further preferred embodiment, the lateral surfaces of the holder and of the continuous groove 22 can be processed or polished.

The adaptor can be mounted in such a way that it can slide in a strip of section fastened in the pressure plate, one lateral surface of the strip constituting part of the groove that accepts the holder.

The adaptor can be secured by a screw inserted into the strip of section from the side the compression belt is located on and perpendicular to the plane of the belt.

The adaptor can also be secured by a screw inserted into the strip of section from the side and parallel to the plane of the compression belt.

A pressure-medium hose that forces the holder against the compression band and is supplied through a pressure-medium line can be mounted in the groove parallel to the holder.

Some preferred embodiments of the invention will now be described with reference to the attached drawings, wherein

DETAILED DESCRIPTION OF THE PREFERRED EMBODIMENTS

Figure 9:
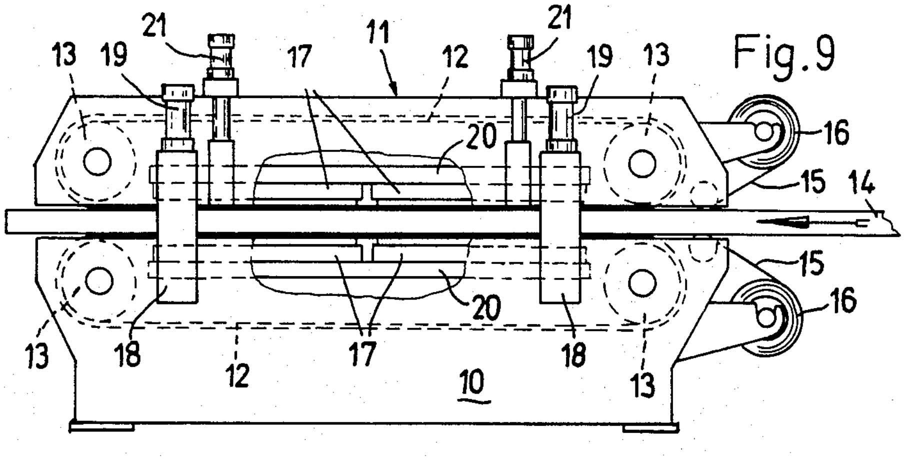
FIG. 9 is a side view of the device with pressure plates acting on the revolving compression belts in order to apply surface pressure to workpieces in the form of sheets.

Referring now to FIG. 9, the device in accordance with the invention consists of a lower frame 10 and an upper frame 11 into each of which a continuous compression belt 12 is built. Compression belts 12 are tensioned over and can be driven by deflection rollers 13. They are positioned together in such a way as to leave a gap that equals the width of a workpiece 14 being processed. The surfaces of the compression belts 12 that come into contact with workpiece 14 move horizontally and draw it into the device, specifically into the gap between the surfaces, where it is subjected to pressure by the surfaces of compression belts 12. Thus, the piece is processed as it travels through the device, leaving the gap between the belts as a finished product as it emerges from the device.

In the present example films 15 taken from supply reels 16 are being applied to the top and bottom of workpiece 14. In order to generate the desired pressure, upper frame 11 can be forced as a whole against lower frame 10 or the requisite pressure can, subsequent to a coarse adjustment of the distance between upper frame 11 and lower frame 10, be exerted with the compressed air prevailing in pressure chambers 17, each of which is positioned at the rear of a compression belt 12 in relation to workpiece 14 or, in other words, against the surface of the belt that does not come into contact with the workpiece.

The embodiment in the present example is coarsely adjusted with sliding guides 18 that are rigidly positioned on lower frame 10 and along which upper frame 11 can be displaced vertically by means of hydraulic cylinders 19. Pressure chambers 17 are demarcated by pressure plates 20 facing frames 10 and 11 and displaced by hydraulic cylinders 21.

As shown in FIGS. 1–4, a sealing strip 23 is secured in a continuous groove 22 around the edge of the surface of pressure plate 20 that faces compression belt 12. Sealing strip 23 rests when mounted against revolving compression belt 12, which travels along the strip in operation. One pressure chamber 17 is accordingly constituted by the surface of a pressure plate 20, by the surface of a compression belt 12 that faces away from workpiece 14, and by surrounding sealing strip 23. A pressure medium like compressed air can be introduced through apertures 24 in pressure plates 20 into pressure chambers 17. A pressure plate 20, which is rectangular, can be rotated for example as a whole around a central shaft 25 that is perpendicular to a compression belt to adapt the width of a pressure chamber 17 to workpieces of different widths.

Holder 27 is rectangular in section and is mounted in such a way that it can be displaced up and down in groove 22 in pressure plate 20. Sealing strip 23 is mounted without play in a groove 26 in holder 27. Holder 27 and sealing strip 23 accordingly constitute one unit. Holder 27, which can be displaced up and down in the continuous groove 22 in pressure plates 20, is elastically secured by a pressure-medium hose 28 that communicates with a pressure-medium line 29 fastened to one side of pressure plate 20. The forces that act on sealing strip 23 and hence on holder 27 during operation are distributed uniformly along continuous groove 22 in the direction traveled by workpiece 14 by several guides 30 positioned at intervals along the periphery of pressure plates 20 and securing holder 27. Guides 30 can for example be commercially available screws 31, each with a threaded end shaped into a guide pin 32 with a smaller diameter. Guide pins 32 engage blind bores 33 on the side of holder 27, each of which is in the shape of a vertical groove that extends transversely to the length of the holder. Since each blind bore groove 33 is as wide as the diameter of guide pins 32, their lateral linear contact also distributes the detrimental horizontal displacement forces of holder 27 in continuous groove 22 over all the screws 31. Holder 27 is also prevented from slipping out of continuous groove 22 when at rest.

Figure 1:
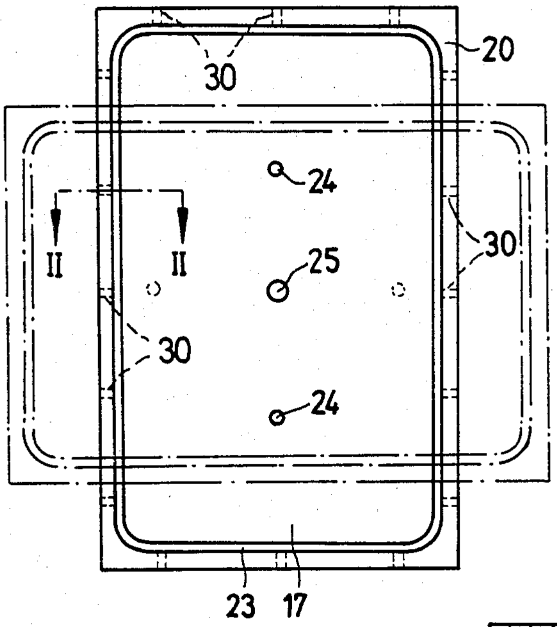
FIG. 1 is a view from the compression belt of a pressure plate that constitutes a pressure chamber in conjunction with the belt.
Figure 2:
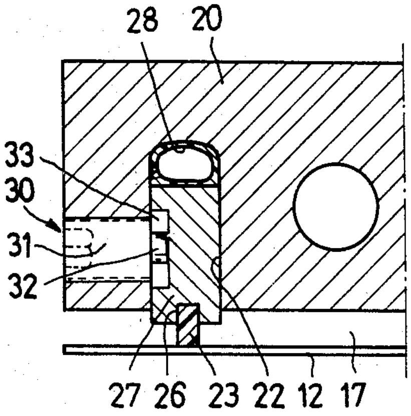
FIG. 2 is a section along the line II—II in FIG. 1.
Figure 3:
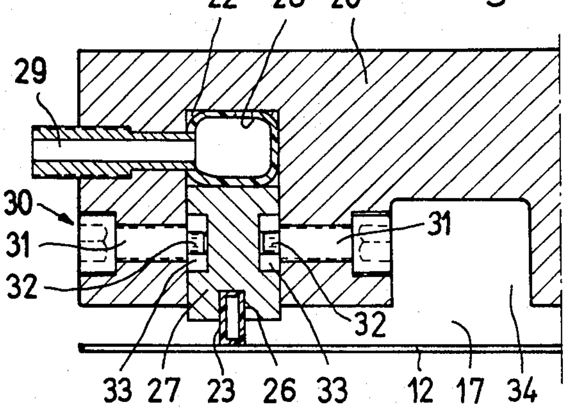
FIG. 3 is a vertical section through the same pressure plate with the holder guided on both sides.
Figure 4:
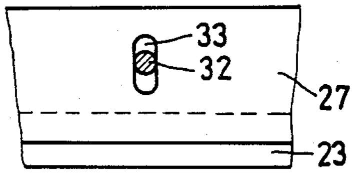
FIG. 4 is a side view of the holder with a vertical groove engaged by a guide pin.

To vertically advance holder 27 easily in continuous groove 22 without a lot of play it can be advantage to process, to polish etc. for example, the lateral surfaces of both the holder and the groove or to lubricate them, in which case grooves 33 will simultaneously constitute bore reliefs. It can also be an advantage to position similar guides 30 on both sides of holder 27, in which case another groove 34 will be necessary at a distance from continuous groove 22 in pressure plate 20 for inserting screws 31. Groove 34 must be at least as wide as a screw 31 is long as shown in FIG. 3.

Figure 5:
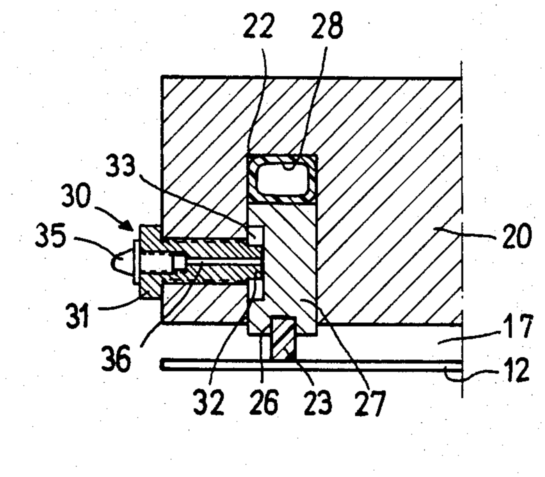
FIG. 5 is a section through the pressure plate as in FIG. 2 with a lubricator nipple introduced into the guide.

As shown in FIG. 5, lubricator nipples 35 for example are screwed into screws 31 for adding fresh lubricant, grease or a similar material, from time to time. Each screw 31 has a longitudinal lubricator bore 36 opening into blind bore 33 to conduct lubricant.

Figure 6:
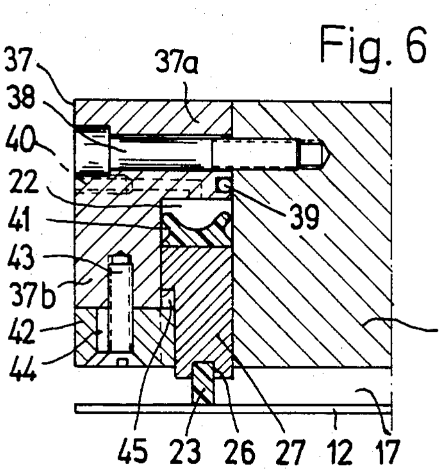
FIG. 6 is a vertical section along the line VI—VI in FIG. 7 through the pressure plate with a different means of securing the holder and the guide.
Figure 7:
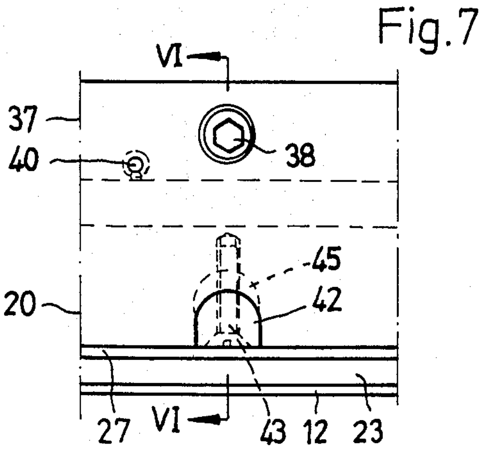
FIG. 7 is a side view of the pressure plate in FIG. 6.
Figure 8:
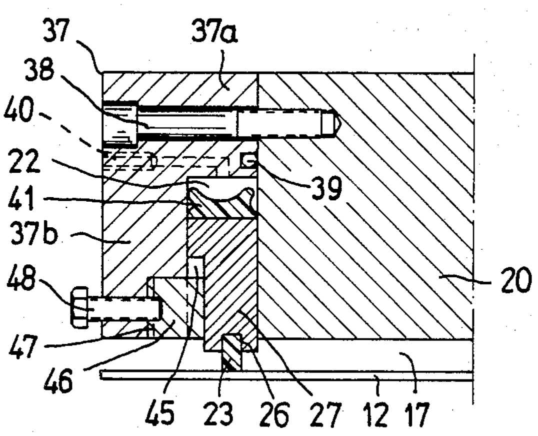
FIG. 8 is a vertical section through another embodiment of the guide and holder.

Each continuous groove 22 in the embodiment illustrated in FIGS. 6 through 8 is demarcated by a continuous strip 37 of section attached by screws 38 to the edge of pressure plates 20. The section is L-shaped, its shorter leg **37*a* resting against pressure plate 20 with screws 38 passing through it into the plate. There is a ring seal 39 at the contact surface between pressure plate 20 and leg 37*a* that seals the resulting continuous groove 22 at the top. There is also a bore 40 parallel to screws 38 and ending in continuous groove 22 to supply pressure medium. The pressure medium acts on a sealing section 41 in continuous groove 22 between holder 27 and the floor of the groove. The pressure medium elastically forces holder 27 against compression belt 12**.

Holder 27 is mounted and guided by several adaptors 42 fastened with screws 43 and extending up from grooves parallel to holder 27 in the vertical leg **37*b* of section strip 37 at intervals from the bottom edge. Each adaptor 42 accordingly has an oblong aperture 44 that a screw 43 passes through, securing the adaptor in such a way that it can be adjusted. Each adaptor 42 can accordingly be displaced horizontally toward holder 27 as shown in FIGS. 6 and 7**.

Each surface of an adaptor 42 that faces holder 27 simultaneously engages a groove 45 that opens downward. The lateral surfaces of adaptors 42 that slide together with the lateral flanks of groove 45 accept the horizontal displacement forces through revolving compression belt 12 and transmit them from holder 27 to pressure plate 20 as a whole. This ensures unobjectionable vertical guidance of holder 27 in continuous groove 22 and the holder cannot tilt.

The top of adaptor 42 is semicircular for example, as shown in FIG. 7, essentially simplifying manufacture.

FIG. 8 illustrates another way of guiding holder 27. Adaptor 46 is mounted from below in a notch 47 and secured in such a way that it can be adjusted at a right angle to holder 27 with screws 48. Adaptors 46 can in this case be short sections of strip, each engaged by two screws 48. An extensive area of folder 27 rests against adaptor 46. Lubricator nipples 35 that lubricant can be conducted through can also be fastened in strip-shaped adaptor 46 to improve sliding and reduce friction.

The advantage of the type of adaptor 42 or 46 illustrated in FIGS. 6 though 8 is that horizontal displacement forces diverted by sealing strip 23 to holder 27 can be transmitted to the lateral surfaces, that is, over an extensive area, of adaptors 42 or 46 or to the adjacent contact surfaces of section 37 and accordingly accepted by pressure plate 20.

The guide pins 32 or adaptors 42 illustrated can be adjusted by means of screws 31, 43, 48, etc. introduced from the side or from the direction of the compression belt in order to vary their pressure against holder 27.

It will be appreciated that the instant specification and claims are set forth by way of illustration and not limitation, and that various modifications and changes may be made without departing from the spirit and scope of the present invention.

What is claimed is:

1. In a device for applying surface pressure to workpieces advancing on at least one movable compression belt, means for forcing the workpiece against the belt including a pressure chamber adjacent to the belt and a hose therein receptive of a pressure medium and a continuous sealing strip between the pressure chamber and belt for sealing off the pressure chamber and means mounting the strip such that the belt slides therealong, including a pressure plate having a groove and a holder in the groove, the improvement wherein the means mounting the strip further comprises at least one lateral recess positioned in the holder transversely to its length and to the surface of the belt connected to the pressure plate and having means disposed in the recess.

2. The device as in claim 1, wherein the process is demarcated at its ends by a curve.

3. The device as in claim 1, wherein the longitudinally displaceable means has a lubricator bore that ends in front of the lateral surface of the holder.

4. The device as in claim 1, wherein the recess is a bore relief.

5. The device as in claim 1, the lateral surfaces of the holder and of the recess are processed.

6. The device as in claim 1, characterized in that the recess is open toward the compression belt.

7. The device as in claim 1, wherein the means connected to the pressure plate includes an adaptor slidably mounted in a strip of section fastened in the pressure plate, one lateral surface of the strip constituting part of the groove that accepts the holder.

8. The device as in claim 7, wherein the adaptor is secured by a screw inserted into the strip of section from the side the compression belt is located on and perpendicular to the plane of the belt.

9. The device as in claim 7, wherein the adaptor is secured by a screw inserted into the strip of section from the side and parallel to the plane of the compression belt.

10. The device as in claim 1, wherein the pressure-medium hose forces the holder against the compression belt and is mounted in the groove parallel to the holder.

* * * * *